Jan. 6, 1931.  O. K. LANDIS  1,788,309
FASTENING
Filed June 29, 1928
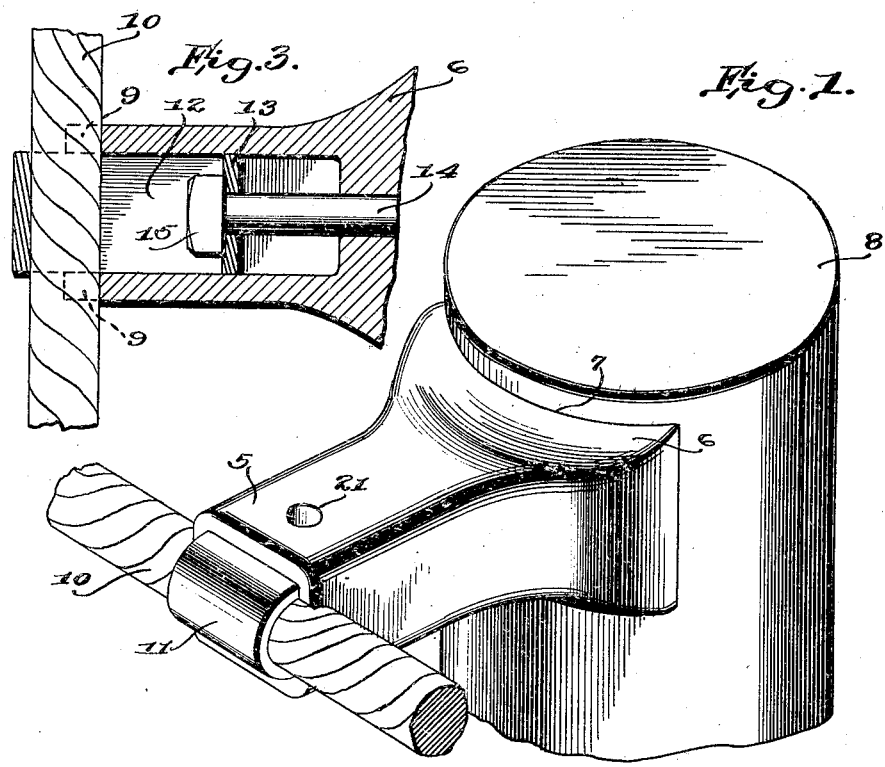
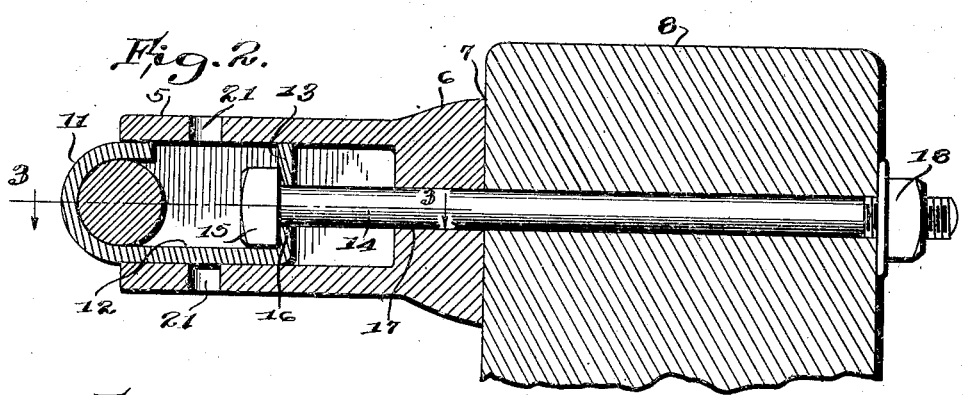
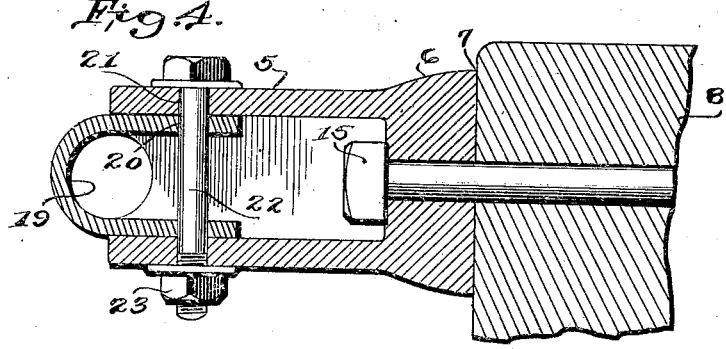
INVENTOR
Omar K. Landis
BY
ATTORNEYS Patented Jan. 6, 1931

1,788,309

UNITED STATES PATENT OFFICE

OMAR K. LANDIS, OF LANCASTER, PENNSYLVANIA

FASTENING

Application filed June 29, 1928. Serial No. 289,175.

My invention relates to fastenings and more particularly to the type of fastenings disclosed in my copending applications Serial Numbers 198,817 and 228,953.

An object of the invention is to provide a strong and durable fastening for retaining flexible elements such as are used on highways as safety barriers and embodies a hollow or tubular arm and a fastening element received therein for holding the flexible element in place.

With the preceding and other objects and advantages in mind, the invention consists in the novel combination of elements, constructions and arrangement of parts to be hereinafter specifically referred to, claimed and illustrated in the accompanying drawings, wherein:

Figure 1 is a perspective of the invention associated with a post and cable,

Figure 2 is a longitudinal sectional view of the same, and

Figure 3 is a horizontal longitudinal section taken on line 3—3 of Figure 2 and Fig. 4 is a view similar to Fig. 2 and showing a modified embodiment of the invention.

Referring to the invention in detail a rectangular in cross section tubular arm or casting 5 having an enlarged solid inner end 6, having a concave inner face 7 to embrace a circular post 8 is provided. At its forward end the side walls of the arm or casting are provided with semi-circular notches 9 for the reception of a cable or other flexible element 10.

For cooperation with the tubular arm in retaining the flexible element in place is a U-shaped element 11 having its legs received within the tubular arm. As illustrated in Figure 2 the lower leg 12 of the U-shaped member is relatively long and terminates in an upstanding or right angularly disposed extension 13. The U-shaped member is of such dimensions as to permit its legs to be snugly received within the arm.

For the purpose of holding the U-shaped member in cooperative relation with the tubular arm and to hold the latter against the post, a securing bolt 14 is provided. The bolt head 15 lies against the inner face of the extension 13 while its shank passes through coinciding openings 16 and 17 in the extension and solid end of the arm, respectively. From the solid end of the arm the shank continues transversely through the post and receives a retaining nut 18.

In lieu of the U-shaped member 11, a U-shaped member 19 may be used in conjunction with the arm, as illustrated in Figure 4. For this purpose the legs of the U-shaped member are provided with vertically alined openings 20 which register with vertically alined openings 21 in the upper and lower walls of the arm. A bolt 22 passes through the registering openings in the arms and U-shaped member and has its lower end projecting below the arm and receives a retaining nut 23.

What is claimed is:

1. In a device of the character described, a rectangular in cross section tubular arm, a U-shaped member having its legs slidably received in the arm, a right angular extension on one of the legs of the U-shaped member and contacting with the walls of the tubular arm, and a bolt loosely engaged with the extension and projecting from one end of the arm to secure the latter to a support.

2. In a device of the character described, a tubular arm to project laterally from a support, a U-shaped member having its legs received in the hollow arm and arranged with its crest opposed to the outer end of the arm to cooperate with the latter in holding a longitudinal element therebetween and contacting with the walls of the latter, a right angular extension on one of the legs of the U-shaped member and lying within the hollow arm, a bolt loosely passing through the extension and having a head normally abutting the extension, the bolt extending from the rear end of the arm and serving to attach the arm to the support and to draw the U-shaped member in an inward direction.

OMAR K. LANDIS.